(12) United States Patent
Yang et al.

(10) Patent No.: US 10,502,967 B2
(45) Date of Patent: Dec. 10, 2019

(54) METHOD FOR RENDERING THREE-DIMENSIONAL IMAGE, IMAGING METHOD AND SYSTEM

(71) Applicant: CHERAY CO. LTD., Hsinchu (TW)

(72) Inventors: Chun-Hsiang Yang, Hsinchu (TW); Yi-Pai Huang, Hsinchu (TW); Kai-Chieh Chang, Kaohsiung (TW); Chih-Hung Ting, New Taipei (TW); Jui-Yi Wu, Miaoli County (TW)

(73) Assignee: CHERAY CO. LTD., Hsinchu (TW)

( * ) Notice: Subject to any disclaimer, the term of this patent is extended or adjusted under 35 U.S.C. 154(b) by 0 days.

(21) Appl. No.: 15/866,738

(22) Filed: Jan. 10, 2018

(65) Prior Publication Data
US 2019/0129192 A1 May 2, 2019

(30) Foreign Application Priority Data
Oct. 27, 2017 (TW) .............................. 106137151 A

(51) Int. Cl.
*G02B 27/22* (2018.01)
*G06T 19/00* (2011.01)
*G02B 27/00* (2006.01)

(52) U.S. Cl.
CPC ..... *G02B 27/2214* (2013.01); *G02B 27/0075* (2013.01); *G02B 27/225* (2013.01); *G06T 19/006* (2013.01)

(58) Field of Classification Search
CPC .............. G02B 27/225; G02B 27/2214; H04N 13/302; H04N 13/305
See application file for complete search history.

(56) References Cited

U.S. PATENT DOCUMENTS

| 2005/0083516 | A1* | 4/2005 | Baker | G02B 27/225 356/124 |
| 2006/0209066 | A1* | 9/2006 | Kubara | H04N 13/307 345/424 |

(Continued)

FOREIGN PATENT DOCUMENTS

| CN | 104297994 A | 1/2015 |
| CN | 105425404 A | 3/2016 |

*Primary Examiner* — Koosha Sharifi-Tafreshi
(74) *Attorney, Agent, or Firm* — Li & Cai Intellectual Property (USA) Office

(57) ABSTRACT

The disclosure is related to a method for rendering a three-dimensional image, an imaging method and a system. The system receives three-dimensional image information regarding. A reference image with respect to the three-dimensional image can be created based on the information. According to the physical information relating to multiple optical elements of a display device, an element image corresponding to each optical element is calculated. The multiple elements images corresponding to the multiple optical elements render an integral image. The integral image is used to render the three-dimensional image through the multiple optical elements. In one embodiment, the optical element is a lens set. The integral image is inputted to a display driving unit of the display device so as to render the element image for every lens set. The display device then displays the integral image so as to from the three-dimensional image through a lens array.

17 Claims, 8 Drawing Sheets

(56) References Cited

U.S. PATENT DOCUMENTS

| | | | |
|---|---|---|---|
| 2009/0079733 A1* | 3/2009 | Fukushima | H04N 13/398 345/419 |
| 2013/0141423 A1* | 6/2013 | Cho | G02B 27/2264 345/419 |
| 2014/0285640 A1* | 9/2014 | Yoon | H04N 13/0011 348/54 |
| 2017/0026638 A1* | 1/2017 | Harris | G06T 1/20 |

* cited by examiner

METHOD FOR RENDERING THREE-DIMENSIONAL IMAGE, IMAGING METHOD AND SYSTEM

BACKGROUND OF THE INVENTION

1. Field of the Invention

The disclosure is related to a technology for rendering an image; more particularly it is to a method for rendering a three-dimensional image by multiple element images corresponding to the optical elements through a multi-optical element module, and a system thereof.

2. Description of Related Art

A variety of conventional methods are available for generating three-dimensional images. Some of the conventional technologies for generating 3D images are based on the principle of binocular parallax with respect to one object. One kind of the three-dimensional images is formed from two images that cause human eyes to see their tiny difference. The other kind of the three-dimensional images are formed in human eyes by playing a series of different images in a loop. A pair of special glasses, e.g. the anaglyph glasses, polarizing glasses or shutter glasses, is usually required to see the 3D image. The images are projected onto a human's eyes and formed as the 3D image with a depth in a brain due to the binocular parallax.

One another way to generate 3D images is through a three-dimensional display device that includes the optical elements. Without any specific glasses, the device allows users to see 3D images through their naked eyes. In this situation, users can see 3D images with a depth at a specific viewing angle when the eyes receive the images with a difference.

SUMMARY OF THE INVENTION

The disclosure is related to a method for rendering a three-dimensional image, an imaging method and a system thereof. The method utilizes a novel technology for rendering a three-dimensional image at a distance from a display plane. The method provides a user a new viewing experience to view the three-dimensional image.

According to one of the embodiments, in the method for rendering the three-dimensional image, the system firstly receives information relating to the three-dimensional image via an input interface unit. The three-dimensional image information includes color information and 3D spatial information of the three-dimensional image. The three-dimensional image information is a plane image data and a depth map, or a set of coordinates and chromaticity value. The information is referred to for rendering the three-dimensional image. A reference image is created for reflecting a spatial relative relation that is used to generate the three-dimensional image. The reference image can be set up by a user to be an image of the three-dimensional image that is finally displayed. A display device for displaying the three-dimensional image is a device including multi-optical elements and a display panel. After the system acquires the physical information of the multi-optical elements of the display device, an element image corresponding to each optical element can be calculated based on the reference image. The multiple element images corresponding to the multi-optical elements form an integral image provided for the display device. The integral image is finally displayed on the display panel and the three-dimensional image is displayed through the multi-optical elements.

Further, the physical information of the multi-optical elements at least includes a spatial relation between spatial position for projecting the three-dimensional image and every optical element, and another spatial relation between every optical element and a display panel of the display device. The physical information will affect how each element image is derived. A viewing position can be further referred to render the element images when it correlates to the physical information of the multi-optical elements.

In one further embodiment, an imaging method is provided. First, an integral image is obtained from previous process. The integral image is then inputted to a display driving unit for generating multiple element images corresponding to the multi-optical elements of the display device. The display driving unit drives the display device to display the integral image, so as to allow the element images to be projected as the three-dimensional image through the multi-optical elements.

In one embodiment, a three-dimensional video can be shown since a series of integral images are continuously outputted through the multi-optical elements.

In the system for rendering the three-dimensional image of the disclosure, a multi-optical element module is included. The multi-optical element module is used to display the three-dimensional image. A display unit is also provided for displaying the integral image and rendering the three-dimensional image through the multi-optical element module. A display driving unit is included and is used to drive display unit to display the integral image. An image processing unit is used to perform the method for rendering the three-dimensional image.

The image processing unit receives information relating to the three-dimensional image via an input interface unit. A spatial relative relation is established according to the three-dimensional image information. An element image corresponding to each optical element is derived according to the spatial relative relation and the information relating to the multi-optical elements. An integral image corresponding to the multiple element images with respect to the multi-optical elements is formed and used for displaying a three-dimensional image through the multi-optical element module.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
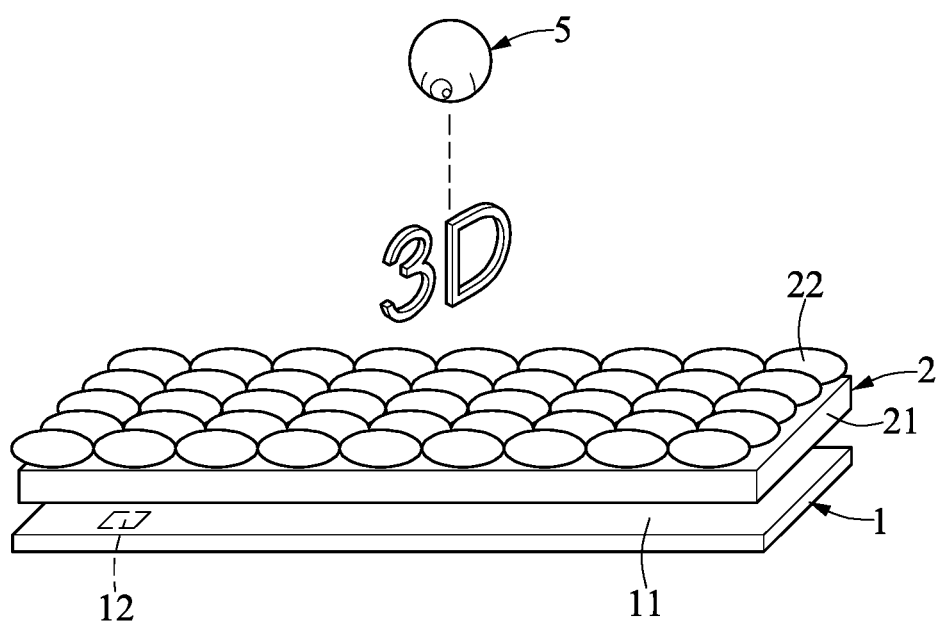
FIG. 1 shows a schematic diagram depicting a display device of a system for rendering a three-dimensional image according to one embodiment of the disclosure.

The embodiment of the disclosure describes a method for rendering a three-dimensional image, an imaging method and a system. The method is adapted to a display device including multi-optical elements for purpose of rendering the three-dimensional image. FIG. 1 shows a schematic diagram of the display device according to one embodiment of the disclosure.

This diagram shows the structure of the display device of the system for rendering the three-dimensional image. A display panel 1 may be a liquid-crystal display panel having a backlight module (not shown in the diagram). The backlight module may be a self-emissive organic light-emitting diode (OLED), but not limited to any specific type of backlight. A display image 11 displayed on the display panel 1 is an integral image that is created by the method for rendering a three-dimensional image. The integral image is constituted of multiple element images. The element images are one-to-one corresponding to the multiple lens sets of a multi-optical element module 2. The element images of the display image 11 can correspond to the images with respect to the positions of the lens sets in a one-to-one, one-to-many or many-to-one manner.

In the multi-optical element module 2, a base 21 and the lens assembly 22 are included. The optical element of the lens assembly 22 may be a lens set. One lens set can be constituted of one or more convex lenses and concave lenses. The multi-optical elements form a lens array. A three-dimensional image is displayed through the multi-optical element module 2. A position and an angle relate to the display device of a viewing position 5 will affect the formation of the integral image and the element image. An image processing unit 12 of the display device is generally used to process the input images, e.g., rendering the three-dimensional image. By the image processing unit 12, the viewing position 5, a position for displaying the three-dimensional image, the physical properties of the lens sets of the multi-optical element module 2, and spatial relations among the elements of the display device are referred to adjusting the reference, calculating the element images and rendering the integral image. In one embodiment of the system, the system can adaptively provide a proper content according to a user's viewing position 5 even if the user changes his viewing position.

The display device can be an electronic device, such as a mobile phone, a tablet computer or a personal computer, which includes a flat display. The display panel 1 is disposed at a lower layer of the display device. The display panel 1 is in charge of displaying a plane image that has not yet been reproduced by light. In general, the display panel 1 is mainly used to display the integral image. The multi-optical element module 2 is disposed at an upper layer of the display device. The multi-optical element module 2 is configured to regulate a light field. For example, the angle of light for the three-dimensional image can be regulated for re-arranging and constituting the plane image that has not yet been re-arranged. In the present embodiment, the integral image can be configured to displaying the three-dimensional image by re-arranging and constituting the lights through the multi-optical element module 2.

The multi-optical element module 2 may be, exemplarily, a lens array including multiple lens sets. A lens assembly 22 is therefore formed. The physical properties of the lens assembly 22 are such as a refraction index and transmittance that are caused by the texture and curvature of the lens. The number and arrangement of the lens sets of the lens array, and disposition of the display panel 1 dominate a height, a range of viewing angle, and a resolution of the three-dimensional image.

The lens set can be a single lens, a lens array, a lenticular lens, or a Fresnel lens. While in the process of imaging, a pin hole, a pin hole array, a barrier and/or a specific point light source can be applied to the imaging. The display device or a display array displays the image and projects the three-dimensional image at a predetermined position.

Figure 2:
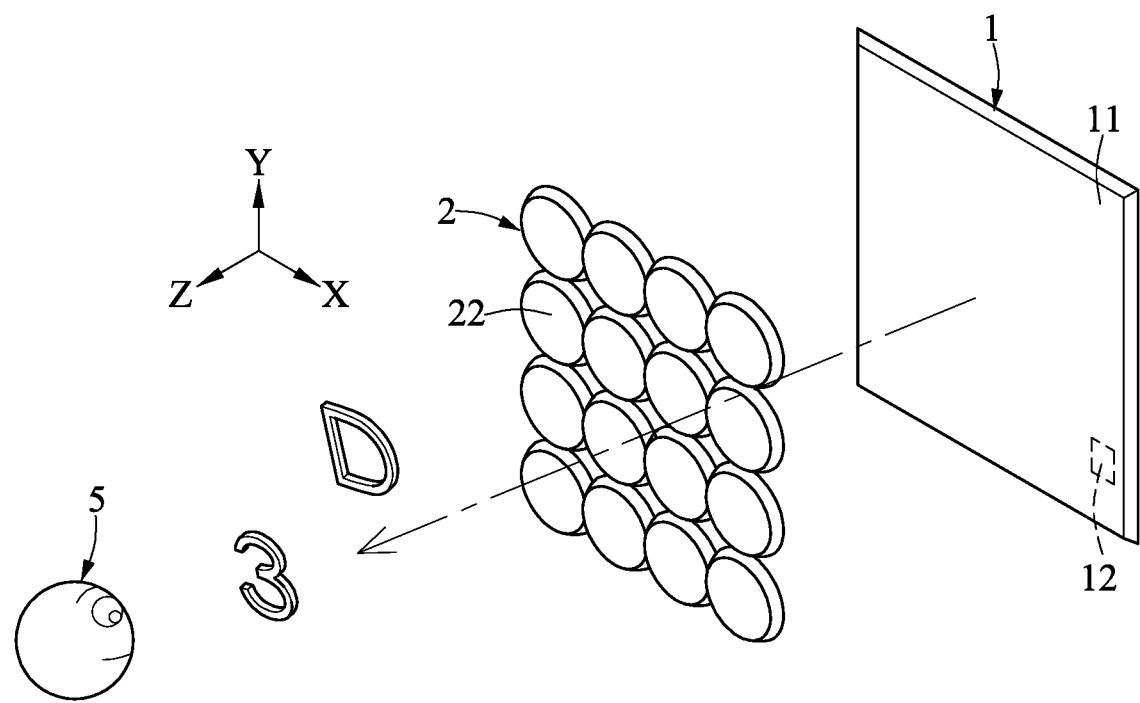
FIG. 2 shows another schematic diagram depicting a display device of a system for rendering a three-dimensional image in one further embodiment of the disclosure.

Reference is next made to FIG. 2, which shows another schematic diagram of the display device for generating the three-dimensional image in one embodiment of the disclosure. In the method for rendering the 3D image, the display panel 1 displays the integral image by arranging the element images. The three-dimensional image can therefore be reproduced through the multi-optical element module 2.

According the embodiment shown in the diagram and in view of the description of FIG. 1, the user is allowed to see a floating three-dimensional image from a viewing position 5. The three-dimensional image is such as a display image 11 that is displayed through the display panel 1. This display image 11 is an integral image rendered from the element images. Every element image corresponds to one optical element of the multi-optical element module 2. The optical element is such as a lens set.

The floating three-dimensional image is rendered through the multi-optical element module 2. The lens sets of the lens assembly 22 are disposed at different positions and allow the user to view the image at a viewing position 5. The image passing through every lens set is projected onto a predetermined spatial position. The lens sets at different positions render different images due to the element images corresponding to the optical elements have a difference from each other.

For example, while projecting a floating three-dimensional image, the optical element on the left side of projected three-dimensional image should project an element image with a projection angle to the left of the three-dimensional image. Similarly, the optical element on the right side of the projected three-dimensional image should project the element image with a projection angle to the right of the three-dimensional image. Further, the optical elements below the three-dimensional image should project an upward image through the element images that are just below the three-dimensional image. Moreover, the floating three-dimensional image that is displayed as floating in the air distances from a display plane. The floating image can be sunk down in the display plane in other embodiments.

Figure 3:
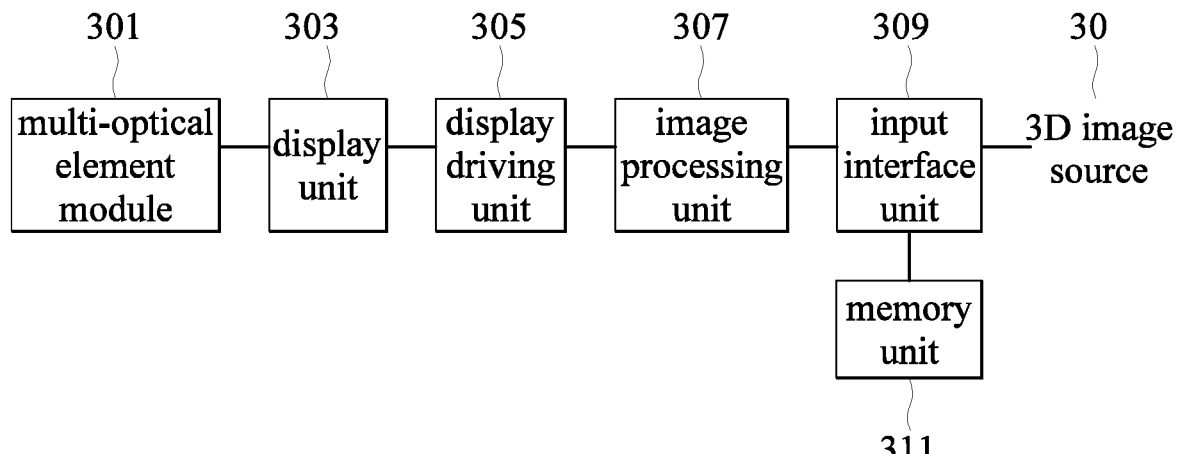
FIG. 3 shows a block diagram describing circuitry of the system for rendering the three-dimensional image according to one embodiment of the disclosure.

The system for rendering the three-dimensional image can be implemented by a circuitry system. Reference is made to FIG. 3, which shows a circuit block diagram describing the system.

The system for rendering the three-dimensional image can be implemented by a combination of hardware and software. The hardware portion of the system can be such as a display device. The circuit units that are electrically interconnected are schematically shown in the diagram. The main components of the system include a multi-optical element module 301 that is constituted of multiple optical elements. The multi-optical element module 301 renders the three-dimensional image. As described in the above embodiments, the optical element is a lens set that is constituted of one or more convex lenses or concave lenses, and the multi-optical elements form a lens array. The system includes a display unit 303 that includes a display panel for displaying an integral image. The integral image is projected through the multi-optical element module 301 so as to generate the three-dimensional image.

The system includes a display driving unit 305 serving as a driving circuit for the display panel. The display driving unit 305 drives the display panel to generate image control signals for the display unit 303 to display the integral image. The system includes an image processing unit 307 that, according to one embodiment, can be an image processing IC. The image processing unit 307 can be implemented by a digital signal processor or a module of software. This image processing unit 307 is the main circuit to perform the method for rendering the three-dimensional image. The image processing unit 307 is electrically connected with a memory unit 311. The memory unit 311 is such as a main memory of the system. The memory unit 311 is used to buffer image data, system operation instructions and calculation instructions. The memory unit 311 provides adequate instructions for calculation and the related image data. The memory unit 311 may act as a buffer that is used to buffer the data that is generated when the system is in operation.

The system includes an input interface unit 309 that is used to connect with an external 3D image source 30. When the image processing unit 307 starts performing the method for rendering the three-dimensional image, the three-dimensional image information is received via the input interface unit 309. The 3D image source 30 can be 3D images drawn by specific hardware and software, where the information such as three-dimensional coordinates and chromaticity that includes the chromatic information of the three-dimensional image and 3D spatial information are recorded in the 3D images. Further, a two-dimensional image and a depth map can be included in the information of the 3D image.

A spatial relative relation is established according to the three-dimensional image information. In a practical case, the information may be reflected by a reference image that reflects the spatial relative relation. The reference image can reflect the three-dimensional image. The reference image is created through hardware of the system and by the user who sets up the system for rendering the three-dimensional image. Next, the system calculates the element images corresponding to the optical elements according to the physical information of the multi-optical element module 301. The system renders the integral image provided for the display unit 303 to display according to the element images of the multi-optical elements. The integral image is used to show the three-dimensional image through the multi-optical element module 301 when the display driving unit 305 drives the displaying.

The physical information relating to the multi-optical element module is mainly referred to the physical properties of the optical element, also a spatial relation between the spatial position for projecting the three-dimensional image and each optical element. For example, the spatial relation includes a distance between the three-dimensional image and every optical element, e.g. the lens set, and a relative angle there-between; the spatial relation includes another distance between every optical element and the display panel of the display unit 303.

The spatial relation can be understood by placing the system in an identical spatial coordinates. By that, the distance and the relative angle between the three-dimensional image and every optical element are calculated according to the spatial coordinates of the three-dimensional image and the coordinates of every optical element, and the relative positions among the optical elements of the system can also be obtained. A distance between every optical element and the display panel can be obtained. The spatial relation may also include the relative position of each optical element of the multi-optical element module. The spatial relation also includes a distance between every optical element and the display panel. The spatial relation is introduced to the calculation with the sizes of image pixels. The various spatial relations become the inputs for the method for rendering the three-dimensional image. The inputs of the method further include a viewing position of the user so as to set up an oblique angle for displaying the three-dimensional image. A ray tracing aspect is then introduced to the method in order to create the plurality of element images, and the display panel displays the integral image that is not yet reproduced.

Figure 4:
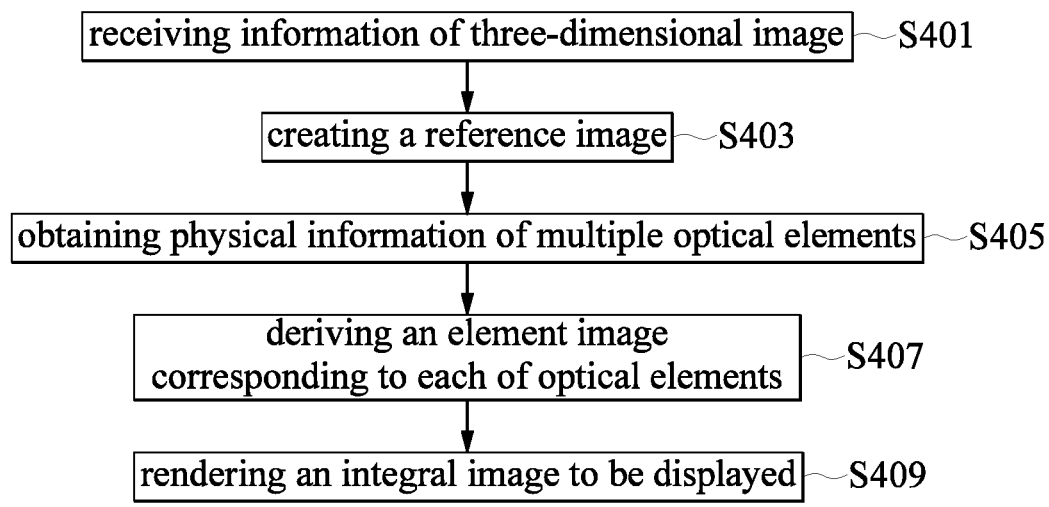
FIG. 4 shows a flow chart describing a method for rendering the three-dimensional image in one embodiment of the disclosure.

FIG. 4 shows a flowchart describing the method for generating the three-dimensional image according to one embodiment of the disclosure. Under the premise of achieving the same result, simple replacement in the following sequence of steps will not affect the embodiments of the method.

In the process starting with step S401, the system receives information from an external image source via an input interface unit. The received information includes chromatic information and 3D spatial information of the three-dimensional image. The 3D spatial information is exemplified as the information of a plane image and a depth map, or a set of coordinates and chromaticity value. The information of the plane image includes pixel coordinates (x, y) and chromatic value. The depth map records a depth value (z value) of every pixel of the plane image. The depth map allows the system to reproduce the 3D image by describing the spatial positions through the 3D coordinates (x, y, z). The chromatic value is then added for accurately showing the colors of the 3D image.

After that, in step S403, the system creates a reference image according to the received three-dimensional image information and user's requirements. The user's requirements are, for example, the user's viewing position, or a projection position of the 3D image. The system can automatically detect the user's viewing position according to the position of the user's eyeball and accordingly create the reference image. The reference image is used to represent the 3D coordinates and chromaticity of the display image. In one embodiment, the original three-dimensional image inputted to the system is converted to the reference image through a coordinate transformation. A coordinate transformation algorithm is particularly utilized to compute a set of transformation parameters.

Next, in step S405, the system obtains the physical information of multiple optical elements. The physical information includes the size and properties of the optical element, coordinates, size and curvature of the single lens set and the lens array, and the spatial relations of the optical elements. The spatial relations of the optical elements include the spatial position related to the single optical element, the spatial relation between each optical element and the display unit or display panel, and the spatial relation between the spatial position and every optical element. In step S407, the system establishes a coordinate transformation function between the original information of the three-dimensional image and the reference image. Through the coordinate transformation algorithm, the system uses the physical information of the optical elements and the coordinate transformation function to derive the element images corresponding to the optical elements from the reference image.

In step S409, a displayed integral image can be rendered from the element images that correspond to multiple optical elements of the display device. More specifically, the element images are provided for the display unit including the display panel and backlight module of display device to display the integral image. The integral image finally becomes the three-dimensional image through the multi-optical elements. The three-dimensional image is consistent with the reference image that can be set up by users or generated by the system.

It is noted that the reference image is rendered based on the positions of the optical elements of the display panel. The optical elements can be set up in the display panel in one-to-one, one-to-multiple or multiple-to-one manner. To render the reference image, the system does not have to refer to the user's viewing position. However, the system still allows the user to view the three-dimensional image from an oblique viewing angle. Therefore, the element images may be altered based on a specific circumstance. The three-dimensional image can be reproduced in a floating manner above the display device, in a sinking manner below the display device, or in front of or at the rear of the display device when the lights are converged through the multi-optical elements. The algorithm acknowledges the diversities among the element images and the integral image from the reference image based on the user's requirements, including the user's viewing position.

Figure 5:
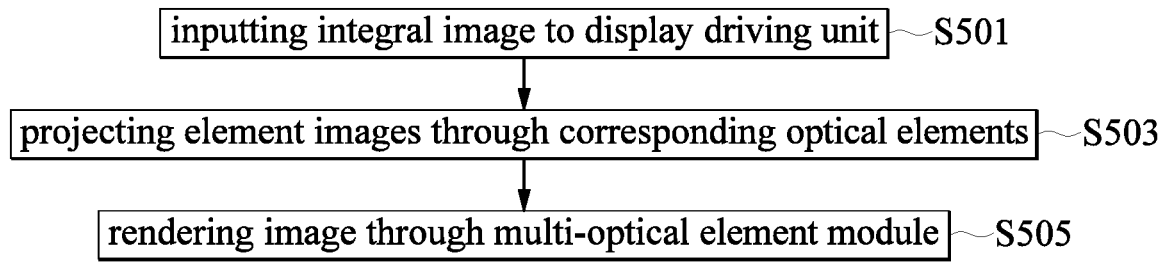
FIG. 5 shows another flow chart describing a method for rendering the three-dimensional image in one further embodiment of the disclosure.

Reference is next made to FIG. 5, which shows a flowchart depicting the method for rendering the three-dimensional image in one embodiment of the disclosure. The 3D image is imaged by the display device. The relative positions of the three-dimensional image and the display device are not limited in the present embodiment. The aspect of the method can also be applicable to render one or more 3D images through two or more display devices in one system.

The system renders the reference image that is used to reflect the spatial position and chromaticity of the three-dimensional image to be displayed. The system renders the element image and the integral image assembling the element images according to the reference image. In step S501, the integral image is inputted to the display driving unit of the system. The display driving unit acts as a driving circuit for driving the display unit to display the image. The integral image is thus displayed through the multi-optical element module. In step S503, the element images are respectively projected through their corresponding optical elements. Finally, in step S505, the three-dimensional image is rendered at a specific spatial position through the multi-optical element module.

Figure 10:
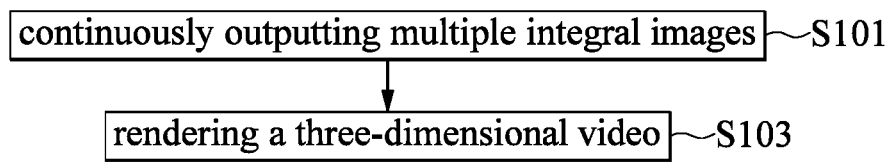
FIG. 10 shows a flowchart describing the method for rendering the three-dimensional image in one more embodiment of the disclosure.

In the process of imaging, the three-dimensional image can be displayed above, below, in front of or behind a display plane formed through the multi-optical elements of the display device. Reference is made to the schematic diagrams shown in FIG. 1 and FIG. 2. FIG. 10 shows the flowchart. If the three-dimensional image information associates with a three-dimensional video, a series of reference images reflecting the altered spatial relative relations are created and a series of integral images are outputted (step S101). The three-dimensional video is displayed through the multi-optical elements (step S103).

Figure 6:
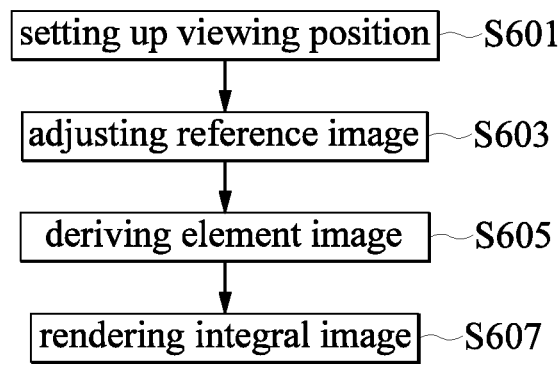
FIG. 6 shows one more flow chart describing a method for rendering the three-dimensional image in one embodiment of the disclosure.

In the process described in FIG. 6, the method also provides a user to set up a viewing position while rendering the integral image or the three-dimensional image, as in step S601. The system can automatically detect the viewing position of the user so as to set up the viewing position of the system. In step S603, the system adjusts the reference image for the viewer to see the 3D image accurately based on the viewing position, so as to allow a viewer to see a specific angular view of the three-dimensional image.

In step S605, the system, as described in the above embodiments, derives the element images from the reference image according to the physical information relating to the optical elements and display device. The element images corresponding to the optical elements are used to form the integral image, as in step S607. This algorithm allows the display device to show the integral image for accurately projecting the 3D image according to the viewer's viewing position.

It is worth noting that, as the lens array shown in FIG. 1 or FIG. 2, the system can automatically exclude some related element images that may cause image deviation when rendering the three-dimensional image with a specific deflected angle. The deviation image can be determined by referring to the reference image. The element images that cause the deviation image can be excluded in advance or after comparing the projected image with the reference image. In practice, the system can adjust, select or delete the element images that cause the image deviation, and then render the integral image. For example, the marginal element images may be excluded in advance since they could generate deflected images through the projection process.

Figure 7:
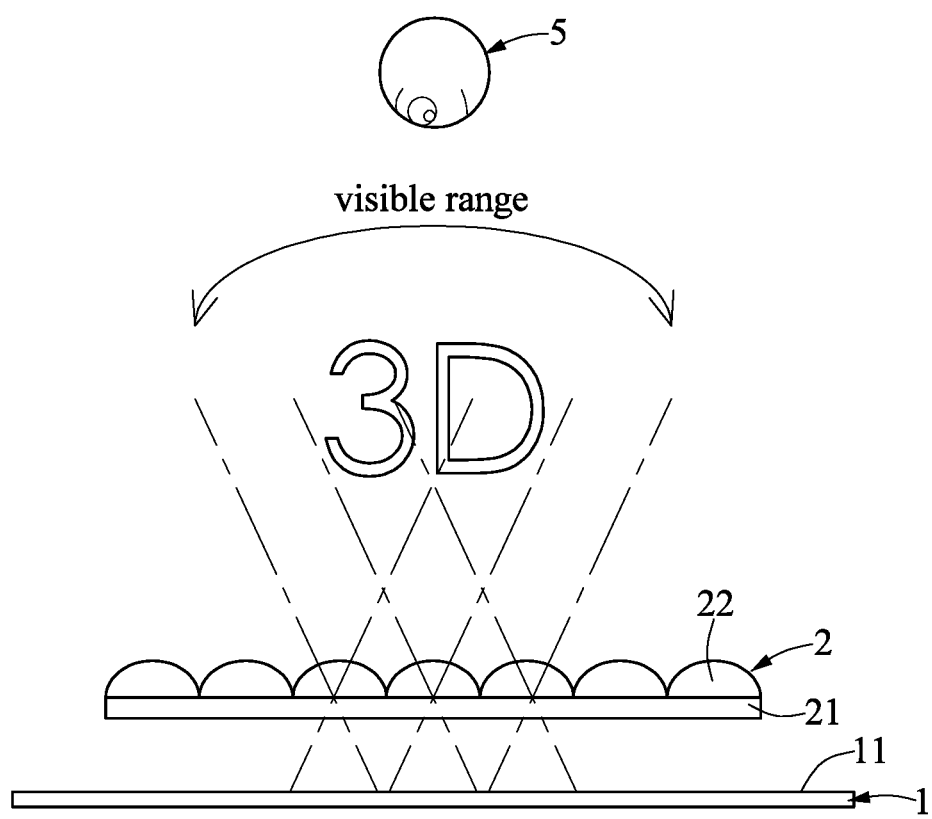
FIG. 7 shows a schematic diagram depicting a visible range formed in an imaging method of the three-dimensional image according to one embodiment of the disclosure.

The related embodiment is shown in the schematic diagram of FIG. 7. An aspect of a visible range with respect to the 3D image is introduced in the process of imaging.

As the diagram shows, a viewing position 5 is located above the display device including the display panel 1 and the multi-optical element module 2. The viewing position 5 is referred to for the system to project the "3D" image. To generate this above three-dimensional image, the system particularly centers the central element images of the display image 11 displayed by the display panel 1, thus the system can determine whether or not the element images that cause image deviation are adjusted or deleted based on the viewing position 5.

Figure 8:
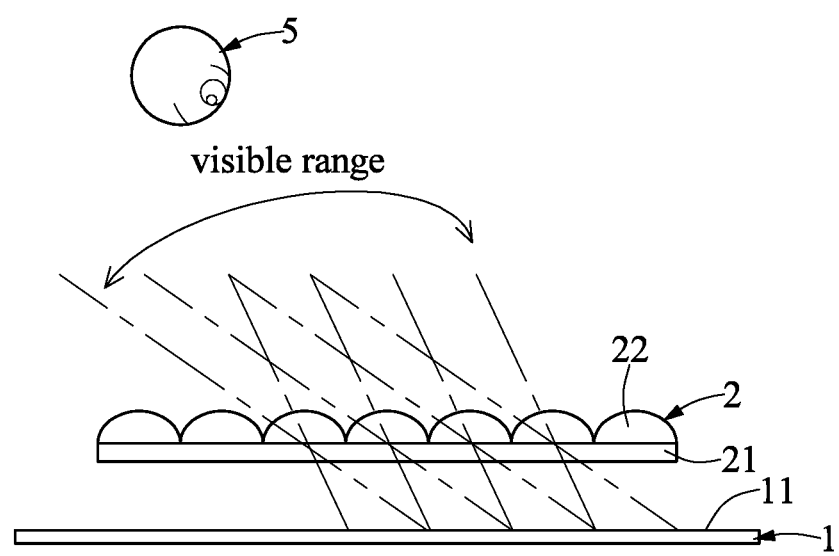
FIG. 8 schematically shows a visible range in the imaging method in one embodiment of the disclosure.

FIG. 8 shows a schematic diagram depicting a visible range formed by the imaging method in one embodiment of the disclosure. The diagram shows a viewing position 5 at an oblique position relative to the display device. The element images will be altered in the calculation due to the changeable viewing position. The calculation should be adjusted based on the viewing positions. Therefore, an offset may exist between the element images when the corresponding optical elements project the element images according to the preset visible range.

Figure 9:
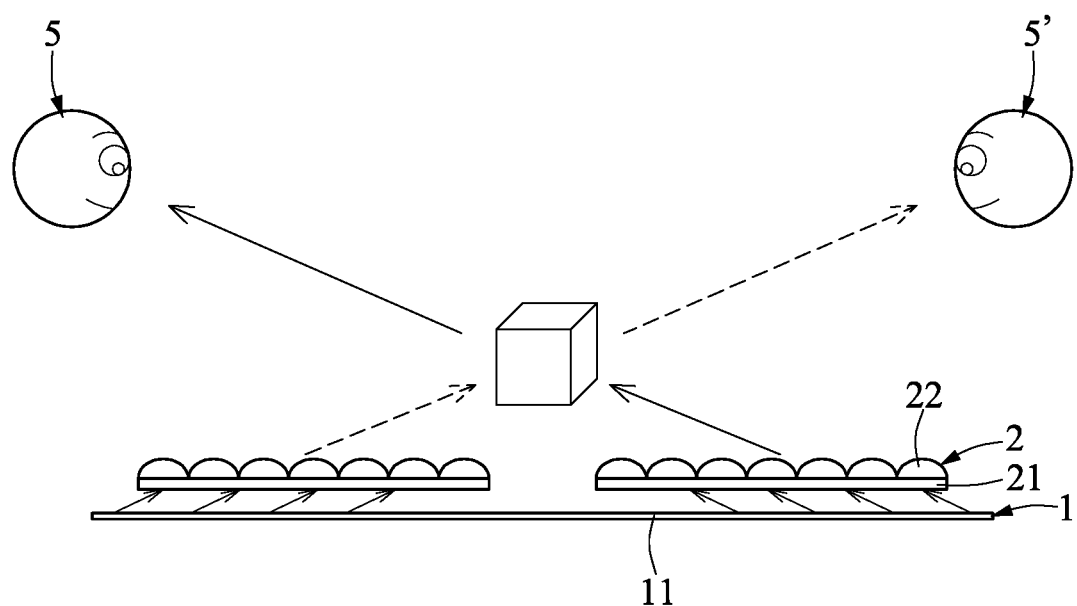
FIG. 9 schematically shows a visible range in the imaging method in one further embodiment of the disclosure.

Reference is made to FIG. 9, which depicts an imaging method of the three-dimensional image. The method forms a visible range as shown in the diagram that depicts an oblique viewing angle. FIG. 9 shows that the viewers are at two sides, e.g., the viewing positions 5 and 5', of the display device. The viewing positions 5 and 5' allow the viewers to see the display content from the opposite sides. A backlight module with a specific directivity can also be introduced to the system to derive the element images and the integral image. The viewing positions 5 and 5' and the physical properties of the optical elements are significant factors to arrange the backlight module and other modules of the system. Therefore the system can efficiently provide at least two viewers at the two viewing positions 5 to 5' to see a front view and a rear view of the three-dimensional image at the same time. The arrangement allows the three-dimensional image to be viewed from one or more viewing positions. It should be noted that the directional backlight can provide a directional light that can effectively avoid interference caused by divergent lights.

According to the above embodiments of the method for rendering the three-dimensional image and the imaging method, a multi-angle visible three-dimensional image from various viewing positions is preferably provided. For rendering an oblique-visible three-dimensional image, the element images may not exactly align with their corresponding optical elements. The method incorporates a display experience with an oblique angle that gathers the lights in a specific oblique direction. Therefore, the viewer can see the three-dimensional image from the oblique viewing direction.

To sum up, according to the embodiments of the disclosure, the method for rendering the three-dimensional image establishes a spatial relative relation according to the information of the three-dimensional image. The information is applied with the physical information relating to the multi-optical elements of the display device for rendering multiple element images and an integral image. The multi-angle or angle-specified visible three-dimensional image can therefore be provided through the optical elements.

It is intended that the specification and depicted embodiments be considered exemplary only, with a true scope of the invention being determined by the broad meaning of the following claims.

What is claimed is:

1. A method for rendering a three-dimensional image, comprising:
   receiving three-dimensional image information, wherein the three-dimensional image information includes a plane image data and a depth map, or a set of coordinates and chromaticity value;
   using the three-dimensional image information to create a reference image used to render the three-dimensional image to be displayed on a display device;
   obtaining physical information relating to multi-optical elements of the display device, wherein the physical information of the multi-optical elements at least includes a spatial relation between spatial positions for displaying the three-dimensional image and every optical element, and another spatial relation between every optical element and a display panel of the display device;
   deriving a plurality of element images, and each of the element images corresponding to each optical element based on the reference image and the physical information relating to the multi-optical elements;
   forming an integral image corresponding to the plurality of element images with respect to the multi-optical elements for the display device to display the three-dimensional image through the multi-optical elements.

2. The method according to claim 1, wherein the three-dimensional image information includes color information and 3D spatial information of the three-dimensional image.

3. The method according to claim 1, wherein, a viewing position is referred to for adjusting the reference image.

4. The method according to claim 3, wherein the three-dimensional image information includes color information and 3D spatial information of the three-dimensional image.

5. The method according to claim 1, wherein the optical element is a lens set that is constituted of one or more convex lenses or concave lenses, and the multi-optical elements form a lens array.

6. The method according to claim 1, wherein, if the three-dimensional image information associates with a three-dimensional video, a series of reference images are created and a series of integral images are outputted; the three-dimensional video is displayed through the multi-optical elements.

7. The method according claim 6, wherein the three-dimensional image information includes color information and 3D spatial information of the three-dimensional image.

8. An imaging method that is used to display the three-dimensional image rendered by the method according to claim 1, wherein the imaging method comprises:
   inputting an integral image to a display driving circuit of a display device; and
   the display driving circuit driving a display to display the integral image, so as to allow the multiple element images of the integral image to be displayed through the multi-optical elements correspondingly to display the three-dimensional image.

9. The method according to claim 8, wherein the three-dimensional image is displayed above, below, in front of or behind a display plane formed through the multi-optical elements of the display device.

10. A system for rendering a three-dimensional image, comprising:
   a plurality of multi-optical elements that are used to render the three-dimensional image, wherein the three-dimensional image information includes a plane image data and a depth map, or a set of coordinates and chromaticity value;
   a display that is used to display an integral image and the three-dimensional image through the plurality of multi-optical elements;
   a display driving circuit that is used to drive the display to display the integral image; and
   an image processor that is used to perform a method for rendering the three-dimensional image comprising:
      receiving the three-dimensional image information from an image source;
      using the three-dimensional image information to create a reference image to render the three-dimensional image to be displayed on the display;
      calculating a plurality of element images, and each of the element images corresponding to each optical element based on the reference image and physical information relating to the plurality of multi-optical elements, wherein the physical information of the plurality of multi-optical elements at least includes a spatial relation between spatial position for displaying the three-dimensional image and every optical element, and another spatial relation between every optical element and a display panel of the display device; and forming an integral image corresponding to the plurality of element images with respect to the multi-optical elements for the display to display the three-dimensional image through the plurality of multi-optical elements.

11. The system according to claim 10, wherein the three-dimensional image information includes color information and 3D spatial information of the three-dimensional image.

12. The system according to claim 10, wherein the optical element is a lens set that is constituted of one or more convex lenses or concave lenses, and the multi-optical elements form a lens array.

13. The system according to claim 12, wherein the three-dimensional image information includes color information and 3D spatial information of the three-dimensional image.

14. The system according to claim 10, wherein, a viewing position is referred to for adjusting the reference image.

15. The system according to claim 10, wherein the three-dimensional image is displayed above, below, in front of or behind a display plane formed through the multi-optical elements of the display device.

16. The system according to claim 10, wherein, if the three-dimensional image information associates with a three-dimensional video, a series of reference images are created and a series of integral images are outputted; the three-dimensional video is displayed through the multi-optical elements.

17. The system according to claim 16, wherein the three-dimensional image information includes color information and 3D spatial information of the three-dimensional image.

* * * * *